(12) United States Patent
Culler et al.

(10) Patent No.: US 8,150,792 B1
(45) Date of Patent: Apr. 3, 2012

(54) SYSTEM AND METHOD FOR PERFORMING ACTIVITIES BASED ON PROXIMITY

(75) Inventors: David E Culler, Berkeley, CA (US); Jonathan W Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 566 days.

(21) Appl. No.: 12/290,830

(22) Filed: Nov. 3, 2008

Related U.S. Application Data

(60) Provisional application No. 61/001,614, filed on Nov. 1, 2007.

(51) Int. Cl.
*G06F 17/00* (2006.01)
*G06N 5/02* (2006.01)
(52) U.S. Cl. .................................................. 706/48
(58) Field of Classification Search .................. None
See application file for complete search history.

(56) References Cited

U.S. PATENT DOCUMENTS

| | | | |
|---|---|---|---|
| 6,563,427 B2 | 5/2003 | Bero et al. | |
| 6,650,902 B1 * | 11/2003 | Richton | 455/456.3 |
| 6,819,908 B2 | 11/2004 | Spratt | |
| 7,164,885 B2 | 1/2007 | Jonsson et al. | |
| 2001/0037361 A1 * | 11/2001 | Croy | 709/203 |
| 2002/0042846 A1 * | 4/2002 | Bottan et al. | 709/249 |
| 2002/0176391 A1 | 11/2002 | Hermann et al. | |
| 2003/0023698 A1 * | 1/2003 | Dieberger et al. | 709/207 |
| 2004/0103313 A1 * | 5/2004 | Kreiner et al. | 713/201 |
| 2009/0068993 A1 * | 3/2009 | Allen | 455/413 |

OTHER PUBLICATIONS

Non-final Office Action mailed Oct. 14, 2008 in U.S. Appl. No. 11/516,841, 18 pages.
Final Office Action mailed Mar. 31, 2009 in U.S. Appl. No. 11/516,841, 21 pages.

* cited by examiner

*Primary Examiner* — Paulinho E Smith
(74) *Attorney, Agent, or Firm* — Fish & Richardson P.C.

(57) ABSTRACT

A system and method applies events to a set of rules, and such rules can produce still other events that can be provided to the same or different set of rules. Rules may have attributes, and all rules or only those with attributes corresponding to an object may be stored for use with a device that has been added to, or is part of, the device.

25 Claims, 3 Drawing Sheets

SYSTEM AND METHOD FOR PERFORMING ACTIVITIES BASED ON PROXIMITY

RELATED APPLICATION

This application claims the benefit of U.S. Provisional Patent Application 61/001,614 entitled, "Method and Apparatus for Performing Activities Based on Proximity" filed by David Culler and Jonathan Hui on Nov. 1, 2007, and is related to the subject matter of U.S. patent application Ser. No. 11/516,841 entitled, "System and Method for Identifying Whether Remote Devices are In Proximity" filed on Sep. 6, 2006 by Jonathan Hui and David Culler, each having the same assignee as this application and each is incorporated herein by reference in its entirety.

FIELD OF THE INVENTION

The present invention is related to computer software and more specifically to computer software for portable devices.

BACKGROUND OF THE INVENTION

Portable devices can be placed in objects that are transported. The devices can detect an event and indicate when the event has occurred.

However, these portable devices are not proximity aware. They cannot respond based on their proximity to another device. It is possible that a central server can determine whether a device is in proximity to a receiver coupled to the server, and then take action or direct the device to take action, but this approach has several drawbacks. First, the approach requires a significant amount of infrastructure, which may be expensive or impossible to install. For example, it may be desirable to track valuable cargo as it moves from one handler to the other through a baggage handling facility of an airport. It may not be possible to place transceivers on a tarmac to allow the central server to identify whether a cargo has passed by, or not passed by, a specific point. Even if it were possible, putting many transceivers all around the airport can be prohibitively expensive.

Even if these problems could be solved, other problems remain. To fit a particular application, it may be necessary to employ complex logic. If a user of such devices wishes to employ complex logic, the user must learn a programming language used to program the application. Because such applications tend to be only infrequently maintained, users don't wish to learn a separate low level or even high level programming language for relatively infrequent use.

What is needed is a system and method that can respond to events including proximity events, without requiring large amounts of infrastructure and without requiring the user to program each application in a programming language.

SUMMARY OF INVENTION

A system and method receives and stores one or more sets of one or more rules. The rules may be received in an English-language-like syntax, and compiled to machine code or byte codes or received in other forms. Each set of rules has zero or more attributes, and the rule sets are stored only if the rule set has no attributes or the attributes correspond, for example, by matching, some or all of the attributes that are assigned to the device that will perform the method or contain at least some of the system. If the device has no attributes, rules that have no attributes in one embodiment, or rules that have zero or more attributes in another embodiment, correspond to the device and will thus be stored.

Each rule set has an active rule. The active rule is initially identified to correspond to the first rule in the set. Events, such as environment detections (e.g. temperature changes) or proximity events that identify a change in proximity to one or more devices in communication with a wireless device containing the system or performing the method, are received and applied against specifications and conditions specified in the rules in one or more rule sets, starting with the active rule in a set, until the first rule is located having specifications and/or conditions that are met by the state of events. Each rule in the set may describe one or more actions that may be performed, outputs that may be provided, or manufactured events, referred to as synthetic events, that are treated as another event that should be performed or provided, if the one or more specifications and/or conditions in the rule identified are met. The actions specified by the first such identified rule are performed, and/or outputs and synthetic events are provided and the state is changed back to the first rule in the rule set. There may be multiple rule sets that are active, and the process is repeated for all such rule sets. Each time an event that applies to that rule set is received, the rule set will again be processed as described above.

Proximity events occur when the proximity of one or more devices changes from the one or more devices being in proximity with the device containing the system, or performing the method, of the present invention. The proximity change can be a "join", in which the one or more devices that were formerly not in proximity come into proximity with the device containing the system, or performing the method, of the present invention. The proximity change can also be a "leave", in which the one or more devices that were formerly in proximity are no longer detected as being in proximity with the device containing the system, or performing the method, of the present invention.

Any number of rules can employ any number of events to allow complex rule sets to be used to perform complex logic functions, yet the English-language-like rule syntax is easy to learn and use. The rules in a single rule set can thus be specified allow combinations of criteria including both proximity events and non-proximity events to trigger an outcome. The combinations of proximity events and non proximity events can be part of the specifications and/or conditions of a single rule, or some rules may have proximity events, and other rules may not, but the effect is to either have outcomes that are either based on the occurrence of combinations of proximity events and non-proximity events, or on sequences of proximity events and non proximity events that may occur.

Thus, for example, if the device is attached to a sprayer of two pesticides for two different crops, with each pesticide harmful to the crop for which it was not intended, the correct pesticide may be used on one crop, and then a different pesticide may be used on a different crop, but only when the sprayer is a sufficient distance from the first crop. The distance used may be determined by the wind conditions at the time, yet even if the required distance is maintained, if the wind is blowing too hard, the sprayer may be instructed not to spray the pesticide at all (or vice versa: the sprayer is only instructed to spray if the proximity to the first crop no longer exists, enough distance, based on the wind speed and direction, has been traveled since that proximity to the first crop was no longer detected, and the wind does not exceed a certain speed). Proximity detection can be performed by placing a device at each crop that identifies the crop to the device attached to the sprayer.

DETAILED DESCRIPTION OF A PREFERRED EMBODIMENT

Figure 1:
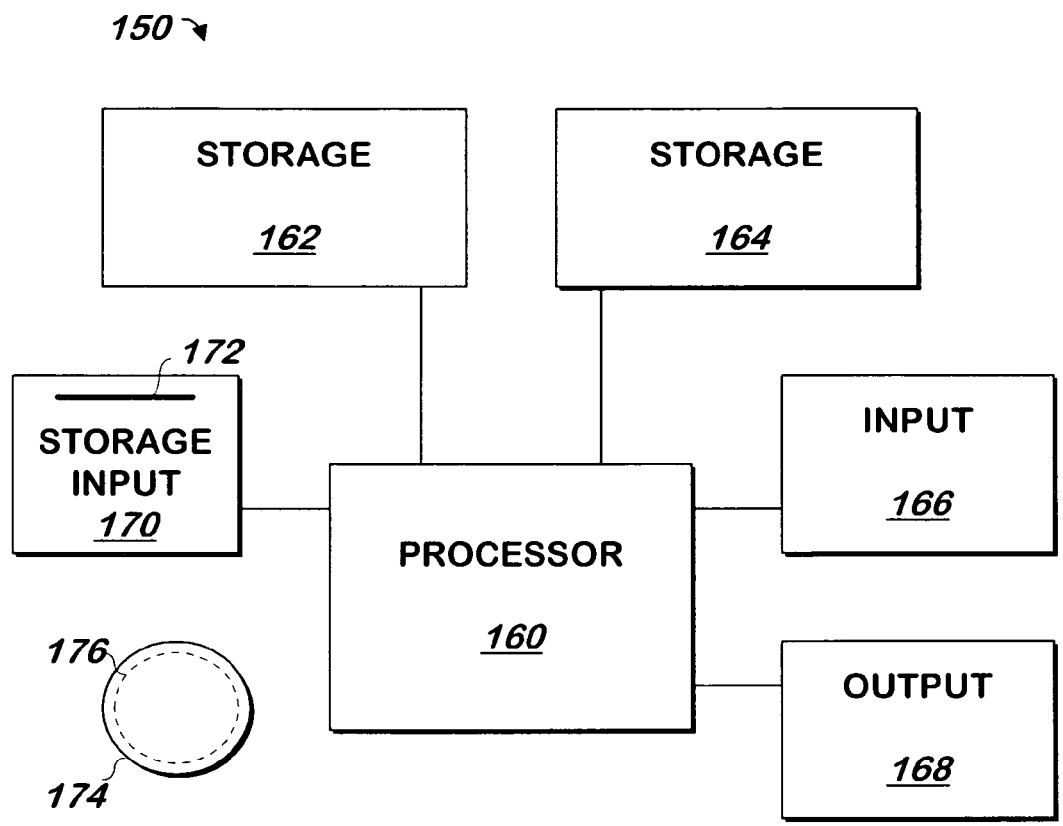
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

Figure 2:
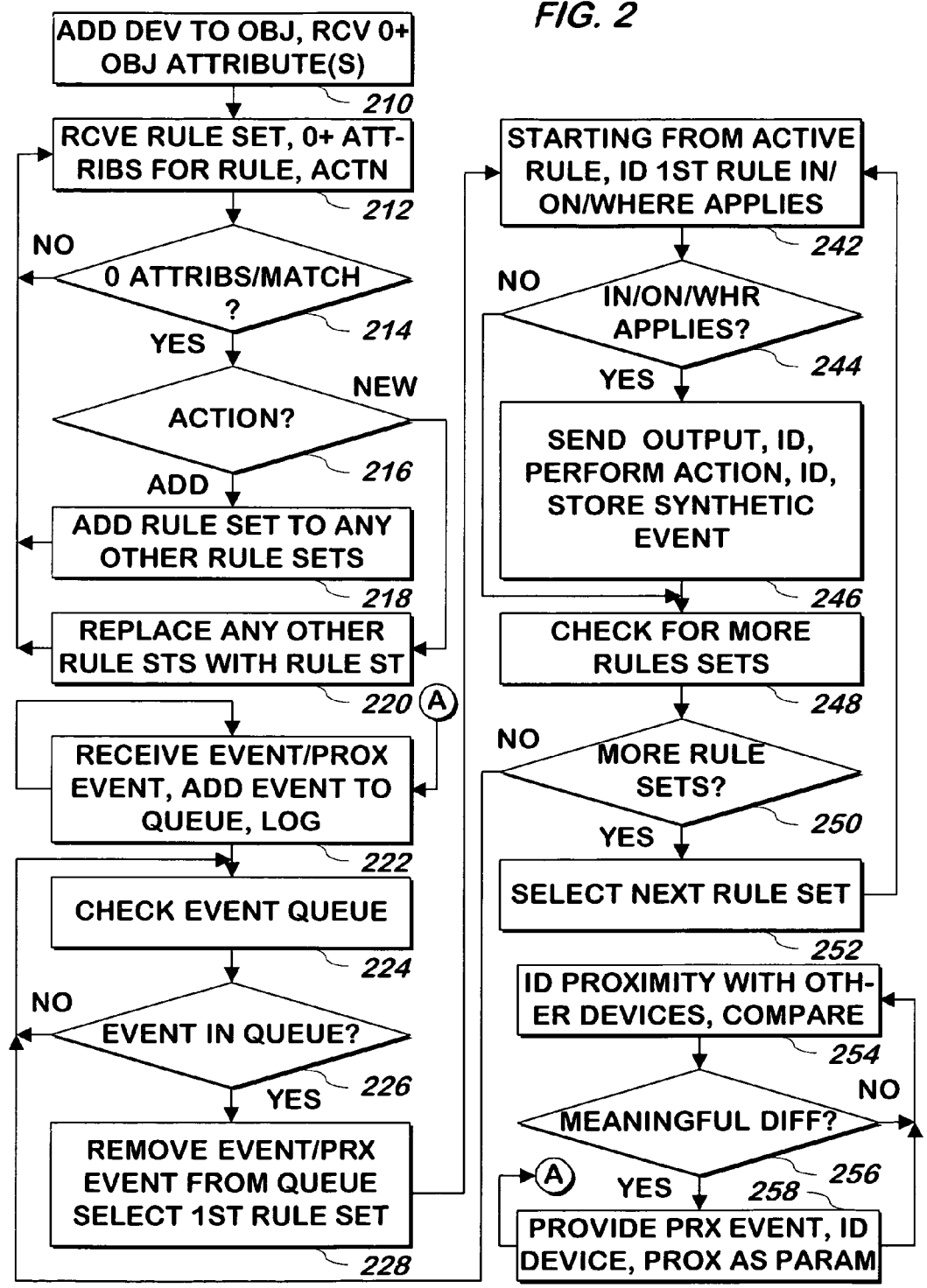
FIG. 2 is a flowchart illustrating a method of responding to events, including proximity events, according to one embodiment of the present invention.

Referring now to FIG. 2, a method of responding to events, including proximity events, is shown according to one embodiment of the present invention. One or more attributes for the object to which the device that is performing the method corresponds, are optionally received 210, although in another embodiment, no attributes for the object are received. Object attributes describe one or more things that are related to the object, or one or more characteristics of the object, for example describing the function of the object, or properties of the object or its environment. In one embodiment, the device that performs as the method described herein is added to the object in a permanent or nonpermanent (e.g. removable) way. The device may be added to the interior of the object in such a way that access to the device is difficult or impossible without damaging or tampering with the object, which itself may constitute an event. For example, the device may be added to the interior of a sealed box.

In one embodiment, the device is mobile. A mobile device is one that uses power from a source other than a stationary source that is shared with other items, such as a conventional power plant. For example, a mobile device may operate from a battery, solar power, wind power, fuel cell or other similar mobile power source.

A rule set is received and any one or more attributes corresponding to that rule set are also optionally received (though no attributes need be received), along with the actions that should be taken upon receipt of the rule set 212. In one embodiment, a rule set is a set of one or more rules described in more detail below. Each rule has one or more event specifications and conditions that, when met, will cause the state to advance to the next logical rule: either a rule specified by the active rule or the next rule in the order of the rules. The conditions correspond to one or more events that can occur. As events are detected, they are applied to the active rule, the rule corresponding to the current state and any rules which logically follow the active rule until a rule is located whose specifications and conditions are met. Thus, the rules in a set are considered one at a time, in the order specified. In one embodiment, a rule set received will have at least one rule with a specification or condition related to a proximity event and at least one rule with a specification and condition not related to a proximity event. The method continues at step 214.

At step 214, if there are no attributes for the rule set, or the attribute or attributes for the rule set received in step 212 correspond to those received in step 210, the action received with the rule set is performed. Otherwise 214, the action associated with the rule set is not performed, and the rule set will thus not be applied against events as described below. In one embodiment, actions may include adding the rule set to a storage area that can contain other rule sets that are received, or replacing any such rule sets stored with the rule set most recently received in step 212. In one embodiment, all of the attributes received at step 212 with the rule set must match those received at step 210 in order for the action associated with the rule set to be performed, and in another embodiment, only one of the attributes received with the rule set at step 212 need match an attribute received at step 210 in order for the action associated with the rule set to be performed. In one embodiment, if no attributes are received for the object, only rule sets that also have no attributes are considered to correspond to the rule set to cause the action to be performed, though in another embodiment, all rule sets will correspond to such objects and cause the action to be performed.

If the action is to add a rule set 216, the rule set is stored 218 in addition to any other rule sets that have been stored, and the method continues at step 212. If the action is to create a new rule set 216, any previously stored rule sets are replaced 220 with the rule set most recently received in step 212, and the method continues at step 212. Other actions may include replacing a currently stored rule set with the one received and having an identifier matching the one stored. In such embodiment an identifier is received and stored with each rule set. Steps 220 and 218 include initializing the state of the rule set to point to the first rule in the set.

In one embodiment, rule sets may be active or inactive. In one embodiment, all received rule sets are initialized as active, though the first instruction may unconditionally set the rule set to inactive, for example until a different rule set activates it. In such embodiment, steps 218 and 220 include setting the state of the received rule set to active. In other embodiments, rule sets are only activated at step 218: rule sets replaced are given the active or inactive status in step 220 of the rule set they replaced. The initial rule set status of active or inactive may be set in accordance with an instruction received with the rule set. Other methods of initializing the state of rule sets and activating or deactivating them may be used.

Once one or more rules sets have been received, the device can respond to events that it receives according to the rule sets stored. If at step 222, an event, including a proximity event, is received, the event is added to a queue. In one embodiment, an event includes an identifier of the type of the event, and one or more parameters describing the event. For example, an event may be a temperature change event or a temperature read event that includes the reading of the temperature as a parameter, with its type being a temperature event. Step 222 may be performed in a continuously running fashion as a process independent from steps 210 through 220 and from steps 224 through 252. Other events may be received, such as a timer elapsing, a time of day reading, or a timer reading. In one embodiment, some or all events are related to physical occurrences, such as physical events that are occurring near enough to be detected by the device or other devices attached to, inside of or otherwise nearby the object to which the device performing the method corresponds. Proximity events are described in more detail herein and below. In one embodiment, the event is also logged in a log of events, timestamped to indicate when the event was received as part of step 222.

An event queue is checked 224, and if there are no events in the queue 226, the method continues at step 224, for example after a short pause. Otherwise 226, the event at the head of the queue, which may be a proximity event, described herein, or a non-proximity event, such as a temperature read or change event or an acceleration detection event, is removed from the queue, and the first active rule set of those stored as described herein and above is selected 228.

Each active rule set has an active rule. The active rule is the first rule in the set that should be investigated as described below.

The active rule of the selected active rule set is identified from among the rules in the selected active rule set, for example by retrieving it from a stored set of states in which each state corresponds to a different rule set, and, starting from the active rule, the first rule, if any, in a logical order of rules of the selected rule set is identified which A) the rule corresponds to the currently applicable state of any rule sets, B) the event or other events applies to the rule, and C) one or more conditions, which may be based on the currently applicable state of events correspond to the rule 242. If each of A), B), and C) above applies to any single rule in the selected rule set 244, the method continues at step 246, (the first such rule identified starting at the active rule having been identified at step 242) and otherwise 244, the method continues at step 248.

In one embodiment, the rule specifies a rule set state, one or more events and a condition. The events and condition may be based on proximity events and events that are not proximity events. In one embodiment, the initial portion of the rule set state may have the form: IN <state_in> ON <event> WHERE <condition>. Each of these must apply for the rule to have been met. The <state_in> specifies the name of a rule set that must be active for the IN portion of the rule to be satisfied, or specifier "all" to indicate that any rule set being active corresponds to this portion of the rule being satisfied. The <event> specifies one or more events that must have occurred for this portion of the rule to be considered to be satisfied. In one embodiment, at least one event must be the event removed from the queue, though in another embodiment, the event could be a currently applicable event, or a currently applicable event still on the queue.

A currently applicable event is one that has not been superceded by another event. For example, if the temperature had been 85 degrees at a time prior to when the rule in the example above was active, but the temperature was below 85 degrees when the above rule became the active rule in the set, because 85 degrees was no longer currently applicable, the rule would not be considered to have been met if <event> specifies a temperature greater than 85 degrees.

<condition> is an expression that resolves to true or false, and this portion of the rule is considered to be met if the condition is true. The event or condition may involve any event state, including proximity and/or non-proximity events. In one embodiment, the condition need only be true at the time the rule in which the condition is specified is considered, and in another embodiment, the condition need be true at the time the event occurred, even if the condition is no longer true.

Each of the rules in the rule set may specify one or more outputs to be to be sent, one or more actions to be performed, or one or more synthetic events to be stored if the condition corresponding to the rule is met when that rule is active. If the identified rule specifies that any such outputs, actions, or events are sent, performed, or stored, respectively, such outputs, actions, or events are sent, performed, or stored, respectively and the initially-identified active rule becomes the active rule for the rule set 246.

In one embodiment, an output is any signal that may be perceived by another device or a human. For example, an output may include sending a signal to a lamp to turn on or off, or sending a signal to a wireless radio to transmit certain information. An output may be sent wirelessly. An action may be performed by taking any step that causes a change. For example, an action may be to move the device.

A synthetic event is an event that is manufactured as the result of the conditions of an active rule being met. Synthetic events are treated, as described below, as events that could cause a state change in the same rule set or a different rule set. Synthetic events are stored in the same queue described above, so that such queue may contain other synthetic events or other events, the events being inputs that are received as described herein.

In one embodiment, the remainder of the rule having the form described above may have the form GOTO <state_out> DO <actions>. <state_out> specifies one or more states that are considered to have occurred when, or immediately after, the rule is met. For example, the state_out could specify a state variable that does not correspond to an event, or even one that does. state_out may be used to create a synthetic event.

<actions> are those that are physically observable, or they may be specified to enable or disable a rule set.

If there is no rule in the rule set for which the state_in, event and condition applies, or there is no rule from the active rule to the logical end of the rules for which the state_in, event and condition applies 244, the method continues at step 248.

The existence of additional active rule sets is checked 248, and if there are more active rule sets 250, the next active rule set is selected 252 and the method continues at step 240 using the newly selected active rule set. Thus a single event can be applied to multiple rule sets. If there are no more rule sets 250, the method continues at step 224.

The non-proximity events may be received from detectors or an operating system. In contrast, proximity events may be generated periodically by the device, or by an external device separate from the device, but in communication with that device, such as wireless communication, that contains the system or performs the method of the present invention. Proximity events identify a list of devices in proximity with the device containing the system or performing the method of the present invention, and compare that proximity with a previously stored list identifying a set of devices with which the device, containing the system or performing the method of the present invention, had been in proximity, and comparing the two lists 254. The lists of devices in proximity are created, for example using the techniques outlined in the related application, which is briefly described below. If there is a meaningful difference between the two lists 256, the proximity event is provided 258 by providing a type that identifies the event as a proximity event, and an identifier of one or more devices to which the proximity event corresponds. A meaningful difference is a difference in proximity with any other device that the device is tracking. In one embodiment, another device which the device is tracking is any device or type of device corresponding to a rule that has been stored as described above.

In one embodiment, the type of the proximity event is provided as a parameter to the event, as is the identifier of the device or devices. In one embodiment, there are two types of proximity events. A join event indicates that another device not recently in proximity with the device containing the system or performing the method of the present invention is now in proximity with the device containing the system or performing the method of the present invention (or another device), and a leave event indicates a device is no longer in proximity with the device containing the system or performing the method of the present invention, but previously was.

If the difference in proximity is not meaningful 256, the method continues at step 254. Following step 258, the method continues at step 254, and also continues at step 222. At step 222, the proximity event is received as described herein and above.

It is noted that, although the output may be made to a server, optionally wirelessly, the application of the events to the rules is performed at the portable device containing some or all of the system or performing some or all of the method of the present invention. Thus, application of events to rules can be performed without any communication with a central server, such as one that would apply events to rules for multiple devices.

Because of the use of synthetic events, the rule sets may be hierarchical. For example, one or more rule sets may include rules which, when events are applied to these rules, produce synthetic events. Other rule sets, which may have been received separately from, and may have different attributes than, such one or more rules sets, may include rules to which those synthetic events apply, and therefore the rule sets that process such synthetic events from one or more rules may handle events which arise from the lower-level rule sets, and may themselves produce other synthetic events to be handled in turn by an even higher-level rule set or sets. Any number of levels may be employed. Rule sets that feed synthetic events to other rule sets are said to descend from those rule sets, and thus are a lower level in the hierarchy than rule sets that process the synthetic events the lower-level rule sets generate. The hierarchy of rule sets may include any number of rule sets related in this way.

System.

Figure 3:
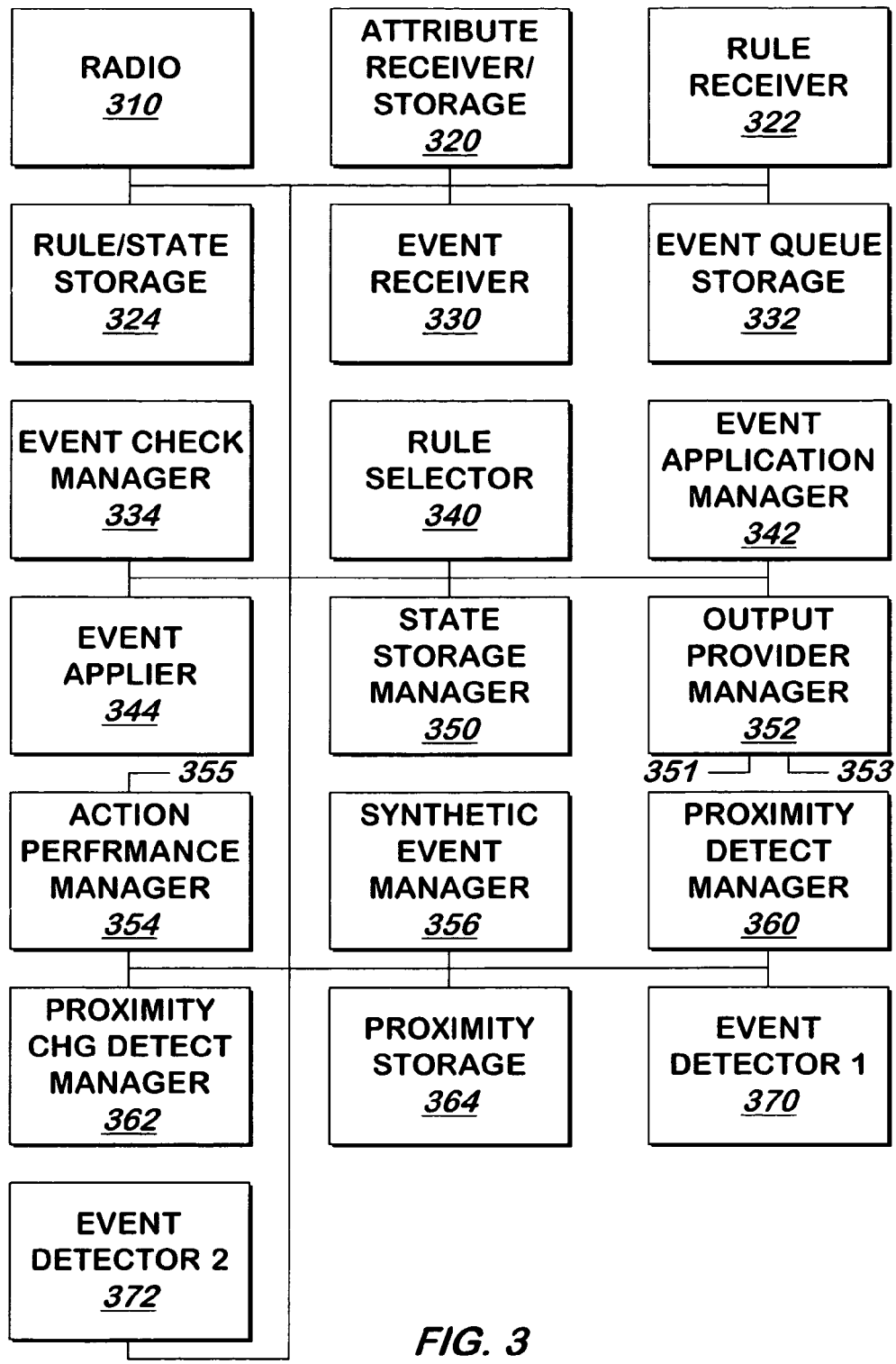
FIG. 3 is a block schematic diagram of a system for responding to events, including proximity events, according to one embodiment of the present invention.

Referring now to FIG. 3, a system for responding to events, including proximity events, is shown according to one embodiment of the present invention. In one embodiment, the device in which the system resides is placed on or inside an object, such as a shipping container. In one embodiment, the device is mobile as described above. At any time, attribute receiver/storage 320 may receive attributes of the object, for example from a system administrator via radio 310, though in one embodiment, no object attributes are received for some or all objects. As described herein and above, object attributes may for example describe one or more characteristics of the object, such as describing the function of the object or properties of the object or its environment. In one embodiment, radio 310 is a conventional IEEE 802.15.x-compatible radio that provides some or all of the capabilities described by one or more 802.15.x specifications. Radio 310 transmits and receives data over a wireless network, though wired networks may also be used. Other radios and/or protocols may be used, such as the conventional 802.11a/b/g/h or other similar protocols. When attribute receiver/storage 320 receives the object attributes, attribute receiver/storage 320 internally stores the object attributes, in one embodiment discarding any previously stored object attributes. In one embodiment, attribute receiver/storage 320 includes conventional memory or disk storage.

At any time, rule receiver 322 may receive a rule set, for example from a server (not shown) via radio 310. As described herein and above, in one embodiment, a rule set is a set of one or more rules that operate as a conventional state machine as described above. In one embodiment, each rule set is received along with zero or more attributes corresponding to the rule set, and an action to be taken upon receipt of the rule.

When rule receiver 322 receives the rule set and associated information, rule receiver 322 determines whether the rule set is applicable to the object corresponding to the device in which the system resides (for example, the shipping container). To do so, rule receiver 322 compares any attributes associated with the newly received rule set to the object attributes stored by attribute receiver/storage 320. In one embodiment, all of the rule set attributes will match the stored object attributes, in order for the rule set to be considered applicable, but if there are no attributes for a rule set, it is considered applicable independently of any stored object attributes. In another embodiment, only some of the attributes of the rule set will match the stored object attributes for the rule set to be considered applicable. In one embodiment, if an object has no attributes, rule sets that also have no attributes are considered applicable, with other rule sets not being considered applicable, though in other embodiments, rule sets that have attributes are considered to be applicable to objects that have no attributes. In another embodiment, no attributes may ever be used for rules or objects, and all rule sets may be considered applicable.

If rule receiver 322 determines that the rule set is not applicable, in one embodiment rule receiver 322 takes no action until a new rule set is received. Otherwise, if rule receiver 322 determines that the new rule set is applicable, rule receiver 322 performs the action associated with the rule set. In one embodiment, the action may be either to add the rule set to any previous rule sets, or to replace any previous rule sets, or a rule set having the same identifier as the rule set received, with the newly received rule set. In this embodiment, rule receiver 322 stores the rule set, and optionally the identifier received with the rule set, in rule/state storage 324, either adding to any additional rule sets or replacing any additional rule sets, or any rule set with the same identifier, according to the action. Other actions may be included in other embodiments. In one embodiment, rule/state storage 324 includes conventional memory or disk storage.

Rule receiver 322 stores in rule/state storage 324 an indication of whether the rule set is active or inactive as described above. In one embodiment the initial active/inactive status of a rule set is received with the rule set and stored by rule receiver 322 in rule/state storage 324.

Rule receiver 322 also stores an indication of the state of the rule set in rule/state storage 324, associated with the rule set. The state of the rule set identifies the active rule in the rule set. In one embodiment, the state for a newly received rule set initially corresponds to the first rule in the set.

At any time, event receiver 330 may receive an event, for example from a server (not shown) via radio 310, or from synthetic event manager 356, proximity change detect manager 362, event detector 1 370, or event detector 2 372, or elsewhere as described herein and below. As described herein and above, in one embodiment, an event includes an identifier of the type of the event, and one or more parameters describing the event. For example, as described herein and above, an event may be a temperature change event or a temperature read event that includes the reading of the temperature as a parameter, with its type being a temperature event, or an event may be a proximity event, or another type of event. When event receiver 330 receives the event, event receiver 330 stores the event in event queue storage 332. In one embodiment, event queue storage 332 includes conventional memory or disk storage arranged as a conventional queue.

In one embodiment, event receiver 330 also signals rule selector 340 upon receipt and storage of the event. Additionally or alternatively, event check manager 334 may periodically (e.g. every half a second) check event queue storage 332 for a new event. If at least one event is stored in event queue storage 332, event check manager 334 signals rule selector 340.

When signaled by event receiver 330 or by event check manager 334, rule selector 340 removes the first queued event from event queue storage 332, and selects the first active rule set stored in rule/state storage 324. Rule selector 340 identifies the active rule in the selected rule set, for example by retrieving the state indication stored associated with the rule set in rule/state storage 324, and creates a rule set record including a pointer to the selected rule set and the retrieved state indication. Rule selector 340 provides the event and the rule set record to event application manager 342.

When event application manager 342 receives the event and the rule set record, event application manager 342 in one embodiment discards any previously retained event that is superceded by the event received. Event application manager 342 also determines whether the event applies to the one or more specifications and or conditions specified by any rule in the selected rule set starting with the active rule as describe above, and if so identifies such rule by storing an identifier of the identified rule in the rule set record. If the conditions do not apply to the specification and/or condition of any rule in the selected rule set starting with the active rule, in one embodiment, event application manager 342 retains the event and signals rule selector 340. When so signaled, if at least one other rule set is stored in rule/state storage 324, rule selector 340 selects the next rule set, identifies the active rule of the newly selected rule set, creates a rule set record including a pointer to the rule set and the state indication, and provides the newly created rule set record to event application manager 342. Event application manager 342 then repeats the process described herein and above of determining whether the event applies to the condition of the active rule of the selected rule set.

If no more rule sets are stored in rule/state storage 324, in one embodiment rule selector 340 determines whether any additional events are queued in event queue storage 332. If so, rule selector 340 removes the next queued event from event queue storage 332, selects the first rule set stored in rule/state storage 324, creates a rule set record including a pointer to the rule set and an indication of the state (e.g. the active rule) of the rule set, and provides the event and the rule set record to event application manager 342. The process described herein and above of applying the event to each of the rule sets therefore repeats for each event in the queue. In one embodiment, if there are no more events queued in event queue storage 332, rule selector 340 takes no further action until signaled by event receiver 330 or by event check manager 334 as described herein and above.

If, as described herein and above, event application manager 342 determines that the one or more specifications and/ or conditions of the active rule of the selected rule set, or any following rule have been met, event application manager 342 provides the event and the rule set record to event applier 344. The result of an event is specified by the active rule as specified by the current state in the rule set record, and may include one or more outputs to be to be sent, one or more actions to be performed, and/or one or more synthetic events to be stored. The result of a rule may therefore include one, many, or no actions to be carried out.

If the result of the active rule whose condition was met includes an output to be sent, event applier 344 provides the output (for that rule) to be sent to output provider manager 352, along with an indication of how the output is to be sent if such an indication is included in the rule. Output provider manager 352 provides the output as described above according to the indication of how the output is to be sent, or optionally according to a default mode of providing output if no indication is received. The default mode may for instance be to provide the output wirelessly via radio 310. Other means of sending outputs may for example include outputs 351 and 353, which could e.g. correspond respectively to a speaker output and to a display output. Therefore, in the example given above where the result of the rule includes "turn on a warning light and emit a series of beeps", output provider manager 352 would display a warning light via output 351 and would emit a series of beeps via output 353. Other forms of outputs may be used in other embodiments.

If the result includes an action to be performed, event applier 344 provides an indication of the action to be performed to action performance manager 354. Action performance manager 354 performs the action as described above. An action might be, for instance, to set a timer, and action performance manager 354 may for instance perform this action via event detector 2 372, which in one embodiment includes a clock. Action performance manager 354 may perform other actions, for example using output 355.

If the result includes one or more synthetic events to be stored, event applier 344 provides an indication of the synthetic event(s) to be stored to synthetic event manager 356. Synthetic event manager 356 creates the synthetic event(s) and provides each such event to event receiver 330, to be queued in event queue storage 332 and processed according to the rule sets as described herein and above. A synthetic event may for example have the type of "synthetic event", and may include such parameters as one corresponding to "warning light is on".

When event applier 344 has provided the result of the rule to output provider manager 352, action performance manager 354, and/or proximity change detect manager 362, event applier 344 signals rule selector 340. When so signaled, rule selector 340 repeats the process described herein and above of selecting the next active rule set, creating a rule set record, and providing the newly created rule set record to event application manager 342, and the process described herein and above of applying the event to the selected rule set repeats thereafter. If no more active rule sets are stored in rule/state storage 324, in one embodiment rule selector 340 selects the next event queued in event queue storage 332, and the process described herein and above of applying the event to each of the active rule sets repeats using the newly selected event, and thereafter for each event queued in event queue storage 332.

As described herein and above, some events may be proximity events. In one embodiment, proximity detect manager 360 periodically, for example once every thirty seconds, creates a proximity list including identifiers of devices that are in proximity with the device in which proximity detect manager 360 resides. Proximity detect manager 360 creates the proximity list as described herein, for example, using the techniques described in the related application, described briefly below. When proximity detect manager 360 has created the proximity list, proximity detect manager 360 provides the proximity list to proximity change detect manager 362.

When proximity change detect manager 362 receives the proximity list, proximity change detect manager 362 compares the newly received proximity list to any proximity list previously stored in proximity storage 364. If the stored proximity list is the same as the newly received proximity list, in one embodiment proximity change detect manager 362 discards the newly received proximity list.

Otherwise, if a device is identified on the newly received proximity list but not on any previously stored proximity list, proximity change detect manager 362 creates a proximity join event, and if a device is identified on the stored proximity list but not on the newly received proximity list, proximity change detect manager 362 creates a proximity leave event. In one embodiment, proximity change detect manager 362 includes the type of the event as a "proximity event", and includes in the parameters of the event an indication of whether the event is a join or leave event, along with the device identifier that was included on one proximity list but not the other. In one embodiment, proximity change detect manager 362 creates a separate proximity event for each such device identified. In another embodiment, proximity change detect manager 362 creates a maximum of one proximity join event and one proximity leave event each time a new proximity list is received, where the proximity join event includes all the device identifiers included on the newly received proximity list but not on the stored proximity list, and the proximity leave event includes all the device identifiers included on the stored proximity list but not on the newly received proximity list. Proximity change detect manager 362 then stores the newly received proximity list into proximity storage 364, replacing any previously stored proximity list.

In one embodiment, if there is no previously stored proximity list, proximity change detect manager 362 stores the newly received list, but takes no further action. In another embodiment, proximity change detect manager 362 provides the identifiers of all devices on the newly received proximity list in one or more join events as described above. In one embodiment, a "new join" event is used by proximity change detect manager 362 in place of a join event in this limited case.

When proximity change detect manager 362 has created the one or more proximity events, proximity change detect manager 362 provides the event(s) to event receiver 330, to be queued in event queue storage 332 and processed according to the rule sets as described herein and above.

In one embodiment, other types of events may also be created and provided to event receiver 330 at any time, for example by event detector 1 370 and event detector 2 372. For example, in one embodiment, event detector 1 370 includes a temperature sensor, and event detector 1 370 periodically, e.g. once every minute, creates temperature events including the current temperature as a parameter, and provides such events to event receiver 330. In another embodiment, event detector 1 370 internally stores the previous temperature, and only creates and provides a temperature event when the temperature changes.

Similarly, in one embodiment, event detector 2 372 includes a clock. Event detector 2 372 may create time events, for example periodically and/or when so directed by action performance manager 354, and may provide such events to event receiver 330, to be queued in event queue storage 332 and processed according to the rule sets as described herein and above.

Creating a Proximity List

To create the proximity list, as described in more detail in the related application, a system and method in one device receives wireless broadcast communications from other devices, with each communication containing a message identifying the device sending the message and a list of the other device from which it has received similar messages. The system and method stores, in a list of identifiers and other information described below, a ping mark associated with an identifier of the device from which the message was received. If the message indicates that the device from which the message was received, has received a similar message from the device corresponding to the system and method, the system and method also stores in the list a pong mark associated with the device identifier of the device from which the message was received. In the event that the message is the first such message from a device, a ping counter and a pong counter are initialized for the device from which the message was received.

Periodically, the system and method scans the list of all device identifiers it has stored, and identifies any ping or pong marks associated with the device identifier. If a ping mark is associated with the device identifier, its corresponding ping counter stored in the list is incremented (up to a limit) and the identifier of the device is added to a list of devices from which the device corresponding to the system and method has recently received communications. Otherwise the ping counter is decremented. If the ping counter drops below a threshold such as zero, the identifier and its marks and counters are removed from the list of device identifiers. If a pong mark is associated with the device identifier, a pong counter associated with that device identifier is incremented (up to a limit) and the pong mark is cleared, and otherwise, the pong counter associated with that device identifier is decremented. If the pong counter is above a first threshold, the devices are determined to be in proximity with one another.

The system and method repeats the above procedure for each identifier on its list. The system and method broadcasts its own message containing its own identifier and the list of devices with which it is in proximity.

An example rule set may have a combination proximity event and non-proximity event specification and/or condition in a first rule, a proximity event specification and/or condition in a second rule, a non proximity event specification and/or condition in a third rule, a proximity event specification and/or condition in a fourth rule, and a non proximity event specification and/or condition in a fifth rule. In one embodiment, a condition is specified as a <condition> specified above, and specification is specified as <state_in> and <event> as described above.

What is claimed is:

1. A method of responding to at least one event, comprising:
    wirelessly receiving in a mobile device a first set of rules, at least one of the first set of rules comprising a condition describing a first event corresponding to proximity between two wireless devices and at least one rule comprising a condition not describing a second event corresponding to a proximity between two wireless devices;
    detecting a change in proximity between a mobile device and at least one other device;
    providing a proximity event responsive to the change detected;
    receiving the proximity event provided;
    identifying at a first time, a first rule in the first set of rules as the active rule of the first set of rules;
    determining whether the condition to the active rule identified is met responsive to the proximity event;
    responsive to the condition not being met, continuing to identify the first rule as the active rule of the first set of rules; and
    responsive to the condition being met, producing a first outcome specified by the first active rule, and changing the active rule in the first set of rules to a next logical rule in the first set of rules.

2. The method of claim 1, additionally comprising:
    receiving a non proximity event describing an event occurring at an object corresponding to the mobile device;
    identifying at a second time the next logical rule as the active rule of the first set of rules;
    determining whether the condition corresponding to the next logical rule is met responsive to the proximity event;
    responsive to said condition not being met, retaining said next logical rule as the active rule of the first set of rules; and
    responsive to said condition being met, producing a second outcome specified by the second active rule and changing the active rule of the first set of rules to a subsequent logical rule.

3. The method of claim 2, wherein the non proximity event comprises a detection of a physical event.

4. The method of claim 1:
    additionally comprising receiving at least one attribute of at least one object; and
    wherein:
        the first set of rules comprises at least one attribute; and
        the wirelessly receiving step is responsive to at least one attribute of the first set of rules and the at least one attribute of the at least one object.

5. The method of claim 1, wherein the detecting the change in proximity is responsive to wireless communications between the mobile device and the other device.

6. The method of claim 1, wherein the outcome comprises an event to be applied to at least one set of at least one rule.

7. The method of claim 6, wherein the at least one set of at least one rule comprises the first set of rules.

8. The method of claim 6, wherein the at least one set of at least one rule comprises a set of at least one rule different from the first set of rules.

9. The method of claim 1, wherein the outcome comprises providing a wireless output.

10. The method of claim 1, wherein the outcome comprises performing an action.

11. A system for responding to at least one event, comprising:
    a rule receiver having an input coupled to a radio for wirelessly receiving in a mobile device a first set of rules, at least one rule in the first set of rules comprising a condition describing a first event corresponding to proximity between two wireless devices and at least one rule comprising a condition not describing a second event corresponding to a proximity between two wireless devices, the rule receiver for providing the rule set at an output;
    a proximity change detection manager having an input coupled to the radio for receiving wirelessly broadcast proximity information, the proximity change detection manager for detecting a change in proximity between a mobile device and at least one other device and for providing at an output a proximity event responsive to the change detected; and
    an event applier having a first input coupled to the proximity change detection manager output for receiving the proximity event provided and a second input coupled to the rule receiver output for receiving the rule set, the event applier for identifying at a first time, a first rule in the first set of rules as active rule in the first set of rules at the event applier second input and for determining whether the condition to the active rule identified is met responsive to the proximity event, and for, responsive to the condition not being met, continuing to identify the first rule as the active rule for the first set of rules, and for, responsive to the condition being met, changing the active rule in the first set of rules to a next logical rule in the first set of rules, and providing at an output an indication that a first outcome should be provided.

12. The system of claim 11, wherein the event applier is additionally for receiving at a third input a non proximity event describing an event occurring at an object corresponding to the mobile device, determining whether the condition to the next logical rule is met responsive to the proximity event, responsive to said condition not being met, retaining the state, and responsive to said condition being met, changing the active rule in the first set of rules to a next logical rule, and providing at the event applier output an indication of a second outcome.

13. The system of claim 12, wherein the non proximity event comprises a detection of a physical event.

14. The system of claim 11 wherein:
    the first set of rules comprises at least one attribute; and
    the rule receiver additionally comprises an attribute input for receiving at least one attribute of at least one object; the rule receiver wirelessly receives responsive to at least one attribute of the least one rule and the at least one attribute of the at least one object.

15. The system of claim 11, wherein the proximity change detection manager detects the change in proximity responsive to wireless communications between the mobile device and the other device.

16. The system of claim 11, additionally comprising a synthetic event manager having an input coupled to the event applier output, the synthetic event applier for providing at an output an event to be applied to at least one set of at least one rule responsive to the indication received at the synthetic event manager input.

17. The system of claim 16, wherein the at least one set of at least one rule comprises the first set of rules.

18. The system of claim 16, wherein the at least one set of at least one rule comprises a set of at least one rule different from the first set of rules.

19. The system of claim 11, additionally comprising an output provider manager having an input coupled to the event applier output for receiving the indication, the output provider manager for providing a wireless output responsive to the indication received at the output provider manager input.

20. The system of claim 11, additionally comprising an action performance manager having an input coupled to the event applier output for receiving the indication, the action performance manager for performing an action responsive to the indication received at the action performance manager input.

21. A computer program product comprising a computer useable medium having computer readable program code embodied therein for responding to at least one event, the computer program product comprising computer readable program code devices configured to cause a computer system to:
wirelessly receive in a mobile device a first set of rules, at least one of the first set of rules comprising a condition describing a first event corresponding to proximity between two wireless devices and at least one rule comprising a condition not describing a second event corresponding to a proximity between two wireless devices;
detect a change in proximity between a mobile device and at least one other device;
provide a proximity event responsive to the change detected;
receive the proximity event provided;
identify at a first time, a first rule in the first set of rules as the active rule of the first set of rules;
determine whether the condition to the active rule identified is met responsive to the proximity event;
responsive to the condition not being met, continue to identify the first rule as the active rule of the first set of rules; and
responsive to the condition being met, produce a first outcome specified by the first active rule, and changing the active rule of the first set of rules to a next logical rule in the first set of rules.

22. The computer program product of claim 1, additionally comprising computer readable program code devices configured to cause the computer system to:
receive a non proximity event describing an event occurring at an object corresponding to the mobile device;
identify at a second time the next logical rule as the active rule of the first set of rules;
determine whether the condition corresponding to the next logical rule is met responsive to the proximity event;
responsive to said condition not being met, retain said next logical rule as the active rule of the first set of rules; and
responsive to said condition being met, produce a second outcome specified by the second active rule and changing the active rule in the first set of rules to a subsequent logical rule.

23. The computer program product of claim 1, wherein the outcome comprises an event to be applied to at least one set of at least one rule.

24. The computer program product of claim 1, wherein the outcome comprises providing a wireless output.

25. The computer program product of claim 1, wherein the outcome comprises performing an action.

* * * * *